US012675377B2

(12) United States Patent
Duraisamy et al.

(10) Patent No.: US 12,675,377 B2
(45) Date of Patent: Jul. 7, 2026

(54) HIERARCHICALLY DECISIONED FAILOVER SYSTEM

(71) Applicant: American Express Travel Related Services Company, Inc., New York, NY (US)

(72) Inventors: Prakasam Duraisamy, Phoenix, AZ (US); Christina Henry, Sun City, AZ (US); Amandeep Singh Juneja, Pleasanton, CA (US); Ryan Edward O'Donnell, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 34 days.

(21) Appl. No.: 18/397,323

(22) Filed: Dec. 27, 2023

(65) Prior Publication Data

US 2025/0217243 A1 Jul. 3, 2025

(51) Int. Cl.
*G06F 11/20* (2006.01)

(52) U.S. Cl.
CPC ...... *G06F 11/2023* (2013.01); *G06F 2201/85* (2013.01)

(58) Field of Classification Search
CPC ............. G06F 11/2023; G06F 11/2025; G06F 11/2028; G06F 11/203; G06F 11/2033
See application file for complete search history.

(56) References Cited

U.S. PATENT DOCUMENTS

| | | | | |
|---|---|---|---|---|
| 10,019,195 | B1 * | 7/2018 | Azmandian | G06F 11/3055 |
| 2005/0120259 | A1 * | 6/2005 | Aoki | G06F 11/2051 |
| | | | | 714/4.11 |
| 2009/0024425 | A1 * | 1/2009 | Calvert | G06Q 10/06315 |
| | | | | 705/7.36 |
| 2010/0162036 | A1 * | 6/2010 | Linden | H04L 41/0659 |
| | | | | 714/4.11 |
| 2013/0227339 | A1 * | 8/2013 | Lund | G06F 11/2023 |
| | | | | 714/4.11 |
| 2015/0347245 | A1 * | 12/2015 | Andre | G06F 11/203 |
| | | | | 714/6.3 |
| 2021/0165688 | A1 * | 6/2021 | Reyes | G06F 11/2023 |
| 2022/0012112 | A1 * | 1/2022 | Wouhaybi | G06F 11/3447 |

FOREIGN PATENT DOCUMENTS

| | | | | |
|---|---|---|---|---|
| CN | 106603299 A | * | 4/2017 | H04L 41/044 |

OTHER PUBLICATIONS

"Heartbeat (computing)." in: Wikipedia. Nov. 25, 2023 [online]. Retrieved from the Internet <URL: https://en.wikipedia.org/w/index.php?title=Heartbeat_(computing)&oldid=1186803607> (Year: 2023).*

* cited by examiner

*Primary Examiner* — Ashish Thomas
*Assistant Examiner* — Bryan P Huang
(74) *Attorney, Agent, or Firm* — Thomas | Horstemeyer, LLP

(57) ABSTRACT

Disclosed are various embodiments for a hierarchically decisioned failover system. First, a health probe can calculate a respective instance health score for each of a plurality of application instances within an application service. Then, the health probe can calculate a service health score for the application service. Next, the health probe can calculate a zone health score for an application ecosystem. Subsequently, the health probe can initiate a failover of the application ecosystem from a first availability zone to a second availability zone based at least in part on the zone health score.

20 Claims, 6 Drawing Sheets

App Instance 203

Reporting Agent
219

Reporting Agent 219

App Instance 203

219

Start

Identify All Errors of Application Instance Since Previous Health Status Report — 403

Classify and Weight Errors — 406

Generate Health Status Report for Each Error — 409

Save Health Status Report for Each Error to Task Queue — 413

End

206

HIERARCHICALLY DECISIONED FAILOVER SYSTEM

BACKGROUND

Enterprises often deploy applications to a cloud provider network to take advantage of flexibility, scalability, reliability, and redundancy offered by the cloud provider. For example, when host machines fail, guests can be migrated to another host machine in the same datacenter or another data center in order to maintain availability and continuity of service. Likewise, when a guest machine is failing to operate or perform as expected (e.g., due to resource contention on the host machine), the guest machine could be migrated to another host machine with more resources available for utilization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for making hierarchical failover determinations for an application stack or ecosystem. It is not uncommon for components of an application deployed to a cloud provider network to fail for various reasons. For example, a web server may receive too many requests for a webpage or website to be able to respond to all requests in a timely manner. As another example, a large read from or write to a database table in a database server could result in the database table being locked for an extended period of time, thereby preventing other applications or services from reading from or writing to the database table during the extended period of time. Other types of failures can also occur within a cloud computing environment, such as a host machine failing and taking any hosted guest machines offline with it.

Many cloud provider networks offer health monitoring services. However, these services are often limited in scope and ability. For example, they may be able to determine if a virtual machine or other guest executing on a host machine has failed or if an application service is non-responsive or performing poorly. However, these existing systems are unable to determine or take into account the type or severity of the failure that has occurred or the impact of the failure within a larger application ecosystem that includes multiple application services working together to accomplish a particular task or provide a particular platform to end users.

In contrast, various embodiments of the present disclosure are able to identify failure states with more granularity and evaluate their impact on a larger application ecosystem. Less severe errors may be ignored as long as their impact on the larger application ecosystem remains minimal, while more severe errors could still result in failover of the application ecosystem from one availability zone 103 to another availability zone 103 if the severe errors occur within more important components of the application ecosystem.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
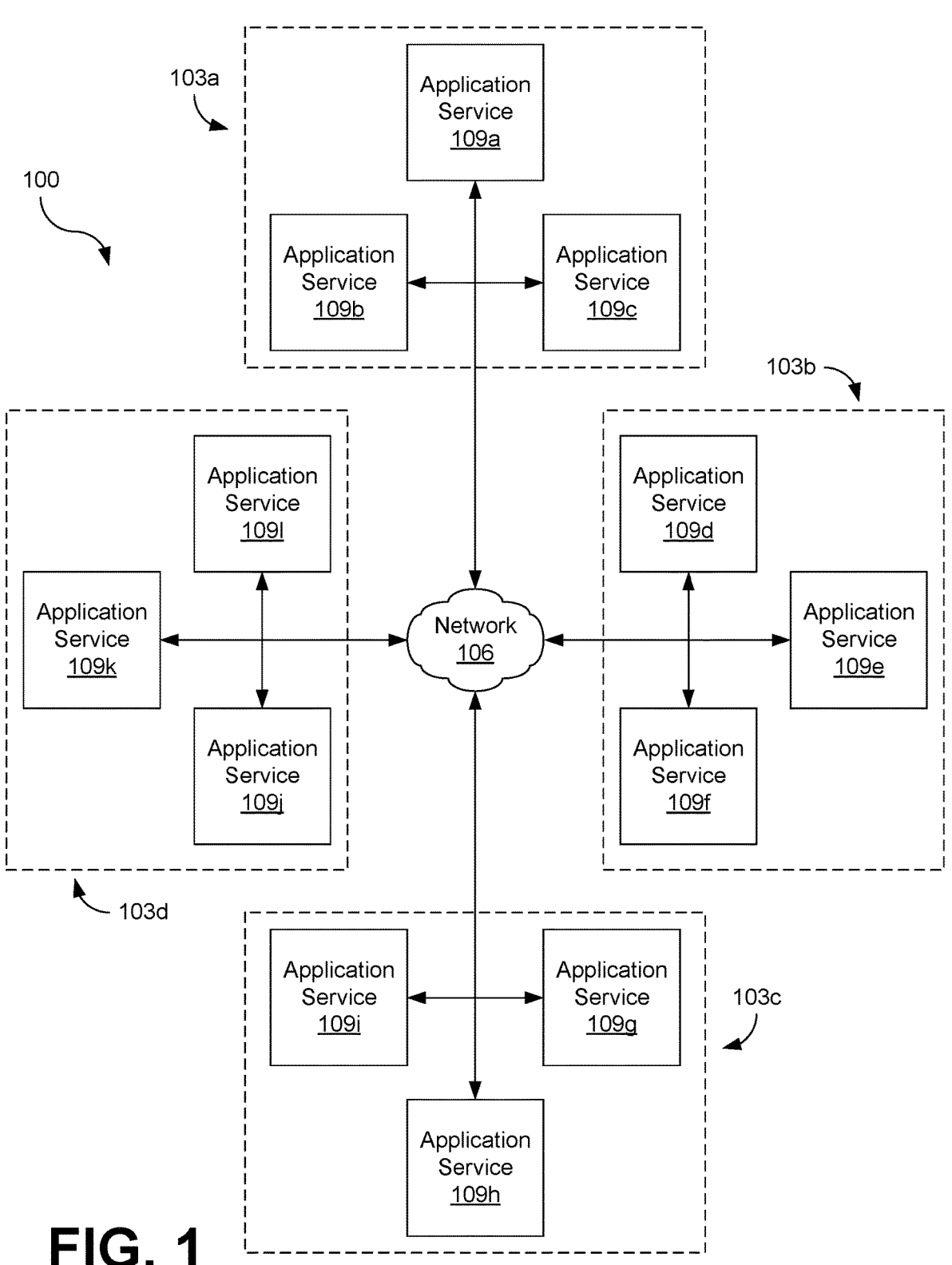
FIG. 1 is a drawing depicting a cloud provider network according to various embodiments of the present disclosure.

FIG. 1 depicts an example of a region 100 of a cloud provider network according to various embodiments of the preset disclosure. Cloud provider networks often provide access to computing resources via a defined set of regions 100, availability zones 103 (e.g., availability zone 103a, availability zone 103b, availability zone 103c, availability zone 103d, etc.), and/or other defined physical locations where a cloud provider network clusters data centers. In many cases, each region 100 represents a geographic area (e.g., a U.S. East region, a U.S. West region, an Asia Pacific region, and the like) that is physically separate from other regions 100, where each region 100 can include two or more availability zones 103 connected to one another via a private high-speed network 106, (e.g., a fiber communication connection). An availability zone 103 (also known as an availability domain, or simply a "zone") can represent an isolated failure domain including one or more data center facilities with separate power, separate networking, and separate cooling from those in another availability zone 103. Preferably, availability zones 103 within a region 100 are positioned far enough away from one other that the same natural disaster should not take more than one availability zone 103 offline at the same time, but close enough together to meet a latency requirement for intra-region communications.

This infrastructure design enables users of a cloud provider network to design their applications to run in multiple physical availability zones 103 and/or multiple regions 100 to achieve greater fault-tolerance and availability. For example, because the various regions 100 and physical availability zones 103 of a cloud provider network are connected to each other with fast, low-latency networking, users can architect applications that automatically failover between regions 100 and physical availability zones 103 with minimal or no interruption to users of the applications should an outage or impairment occur in any particular region 100.

For example, each availability zone 103 could have one or more application services 109 deployed within it. An application service 109 can represent a set of application instances 203 (FIG. 2A) deployed together to provide the services of an application. As an illustrative and non-limiting example, an application service 109 for a website could include multiple application instances 203 of a web server behind a load balancer, with each instance of the web server being configured to respond to requests for the website. To continue this illustrative and non-limiting example, the application instances 203 could further include database servers that serve as a backend to the website by storing data or content for the website. Other application services 109 could be deployed within an availability zone 103 to provide specific functionality, such as user login or user authentication services, payment services (e.g., payment processing, payment authorization, etc.), fraud detection and/or prevention services, user account management services, etc. Moreover, related application services 109 could be deployed together as an application ecosystem 200 (FIG. 2).

Figure 2A:
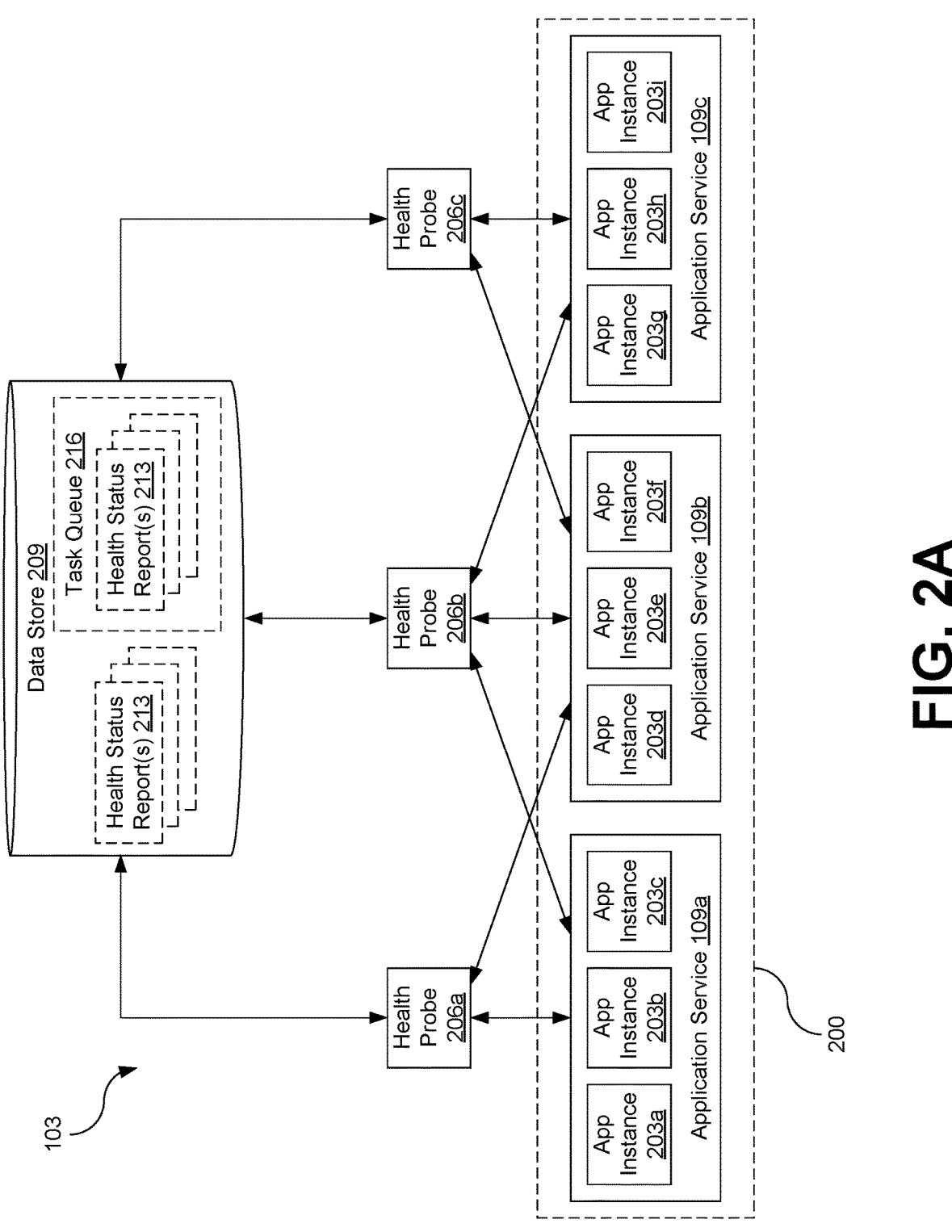
FIGS. 2A-2C are drawings depicting the contents of an availability zone within the cloud provider network according to various embodiments of the present disclosure.

FIG. 2A is a depiction of a deployment of an application ecosystem 200 within an availability zone 103 according to various embodiments of the present disclosure. As previously mentioned, an application ecosystem 200 represents a collection of related application services 109 that can be deployed together within the same availability zone 103. In many instances, the application services 109 within an application ecosystem 200 may be interrelated or have operational dependencies on each other. For example, in a payments application ecosystem 200, a first application service 109 (e.g., application service 109a) may be responsible for authorizing payment requests received from point-of-sale (POS) devices, a second application service 109 (e.g., application service 109b) may be responsible for performing fraud detection and prevention, and a third application service 109 (e.g., application service 109c) could be responsible for the transfer of funds. As another example, a website application ecosystem 200 could use a first application service 109 to perform user authentication and sign-in functions and a second application service 109 to provide the features and content of the website. In both of these examples, additional application services 109 could be included in an application ecosystem 200 in order to provide additional functionality or to provide dedicated resources to a particular function.

As noted in FIG. 2A, each application service 109 could include multiple application instances 203. As previously indicated, an application instance 203 can represent a single deployment of an application, including all necessary resources to run the application. For example, an application instance 203 could include one or more virtual machines or containers (operating-system level virtualization constructs) hosting or providing components (e.g., web server, database server, cache server, files, etc.) of an application. Although only a single application instance 203 is required for an application to be executed and provide services to others, multiple application instances 203 could be deployed to form an application service 109 in order to service large numbers of requests and/or to provide for redundancy and scalability. Examples of application instances 109 can include KUBERNETES® pods or other groups of containers with shared storage and network resources.

One or more health probes 206 (e.g., health probe 206a, health probe 206b, health probe 206c, etc.) can also be deployed within the availability zone 103. Each health probe 206 can be deployed to monitor the health of individual application instances 203 within individual application services 109 of an application ecosystem 200. Multiple health probes 206 may be deployed together to operate in a distributed manner in various embodiments of the present disclosure.

As discussed in further detail later, a health probe 206 can be executed to make hierarchical failover decisions for the application ecosystem 200. For example, the health probe

206 can calculate a health score for individual application instances 203 to determine how close they are to failure or if they have already failed. Although the failure of a single application instance 203 may not measurably impact the operation of the respective application service 109, the failure or impending failure of multiple application instances 203 could result in degraded performance or failure of the respective application service 109. Accordingly, the health probe 206 can evaluate the health of the application service 109 (e.g., is it still functioning as required or desired or is it approaching a failure point) based at least in part on the health of each of the component application instances 203 that form the application service 109.

Notably, the health probe 206 avoids making failover decisions for individual application instances 203 or individual application services 109 for several reasons. First, many application ecosystems 200 contain application services 109 with varying levels of importance. Less important application services 109 might be able to operate in a degraded state without impacting customer, client, or end-user experiences. Second, partial migrations of components of an application ecosystem 200, such as in response to a failure, could introduce additional latency or other issues that could cause additional failures to occur.

For example, in a payments application ecosystem 200, payments to a merchant using a credit, debit, charge, stored-value, or other transaction card can still be processed even if an application service 109c responsible for transferring funds is operating in a degraded state as the funds will be eventually transferred. However, the payments application ecosystem 200 could require or desire that an application service 109a responsible for authorizing payment requests from point-of-sale (POS) devices and an application service 109b responsible for performing fraud detection and prevention operate at full capacity or in a non-degraded state in order to quickly and efficiently authorize payments made with the POS device.

As a second example, initiating a failover of components of the application ecosystem 200 could introduce additional performance issues or failures. For example, if half of the application instances 203 of an application service 109 in an application ecosystem 200 were migrated to another availability zone 103, additional latencies could be introduced when the application service 109 attempts to respond to requests from other application services 109. For example, if half of the application instances 203 within application service 109a were moved to a second availability zone 103, then the application service 109a might be delayed in responding to half of the requests it receives from application service 109b. That delay could cause half of the requests from application service 109b to timeout, thereby cause application service 109b to begin to fail.

The health probes 206 can be executed by one or more computing devices that include a processor, a memory, and/or a network interface. For example, the computing devices can be configured to perform computations on behalf of other computing devices or applications. As another example, such computing devices can host and/or provide content to other computing devices in response to requests for content. In some instances, the computing devices can be physical or "bare-metal" computing devices, while in other instances the computing devices could be virtualized computing devices (e.g., virtual machines, containers, etc.).

In addition, a data store 209 can be located in the availability zone 103 for use by the health probes 206. The data store 209 can be representative of a plurality of data stores 209, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 209 is associated with the operation of the various applications or functional entities described below. This data can include health status reports 213, a task queue 216, and potentially other data.

The health status reports 213 can represent individual reports of events received from reporting agents 219 (FIG. 2B and FIG. 2C) of a respective application instances 203. For example, a health status report 213 could include a category of the event or incident, a timestamp representing the time the event or incident occurred, a weight representing the severity or impact of the event, a description of the event, an instance identifier of the application instance 203 that reported the event, and a service identifier of the application service 109 that the application instance 203 is registered to, associated with, or a component of.

The task queue 216 can represent a list of tasks to be performed or data to be processed by instances of the health probe 206. For example, a task queue 216 could include one or more health status reports 213 received from reporting agents 219. These health status reports 213 could be stored until evaluated and processed by the health probe 206. The task queue 216 could also include other tasks to be performed, such as registering new application instances 203 or application services 109 for monitoring, initiating a failover of the application ecosystem 200, etc.)

Figures 2B, 2C:
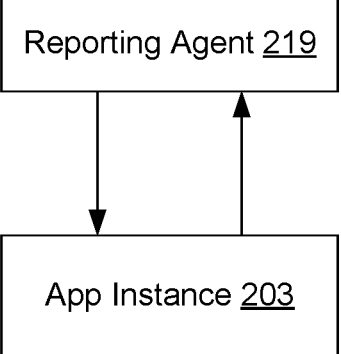

FIGS. 2B and 2C are diagrams depicting the relationship between a reporting agent 219 and an application instance 203 according to various embodiments of the present disclosure.

In some instances, such as those depicted in FIG. 2B, the reporting agent 219 could be deployed as a component of an application instance 203. This embodiment could be implemented when the reporting agent 219 is a library that could be included or integrated into the code of an application instance 203. In these embodiments, the reporting agent 219 could directly monitor or profile the performance of the application instance 203 and report to the health probe 216 at periodic intervals.

In other instances, such as those depicted in FIG. 2C, the reporting agent 219 could be deployed as a proxy sitting in front of the application instance 203. Requests and responses from the application instance 203 can be monitored (e.g., to determine whether a response is sent, how long it takes to send a response to a request, the number of requests processed within a predefined window or period of time, etc.). Moreover, the reporting agent 219 could also application instance 203 reading log files or event histories generated by the application instance 203 or the containers therein in order to identify any errors that might have occurred during the execution of the application instance 203. The reporting agent 219 could then report to the health probe 216 at periodic intervals.

Next, a general description of the operation of the various components of the availability zone 103 is provided. Although the following general description describes the interactions between various components deployed within an availability zone 103, other interactions are also encompassed by various embodiments of the present disclosure.

To begin, an application ecosystem 200 could be configured to be monitored by one or more health probes 206. This could include configuring one or more reporting agents 219 to report to the health probe(s) 206, as well as registering individual reporting agents 219, application instances 203, and/or application services 109 with the health probes 206 to enable the health probes 206 to track which application instances 203 are providing health status reports 213 and which application instances 203 and/or application services 109 would need to be migrated to another availability zone 103 in the event of a failover.

Subsequently, the reporting agents 219 can save health status reports 213 to the task queue 216. The health probe(s) 206 can periodically evaluate the task queue to identify newly saved health status reports 213 for processing. If a health probe 206 determines that a reporting agent 219 for an application service 109 has failed to provide a health status report 213 within a previous sliding window of time, the health probe 206 can send a request for the health status report 213 to the reporting agent 219 for the application instance 203. If a health status report 213 is not provided by the reporting agent 219 in response to the request, the health probe 206 can save a highest severity health status report 213 to the task queue 216 indicating that the application instance 203 is offline or otherwise unavailable.

The health probe 206 can then do a hierarchical evaluation of the health of the application ecosystem 200 to determine if a failover of the application ecosystem 200 to another availability zone 103 is desired or required. This can be done by calculating a weighted average health score for each application instance 203 in an application service 109. A service health score can then be calculated as the average of each instance health score for each application instance 203 in the application service 109. A zone health score can then be calculated as the weighted average of the service health score for each application service 109 within the application ecosystem 200.

If the zone health score meets or exceeds a predefined threshold, the health probe 206 can initiate a failover of the application ecosystem 200. This could cause the application ecosystem 200 to migrate or be migrated from the current availability zone 103 to a new availability zone 103 within the region 100.

Figure 3:
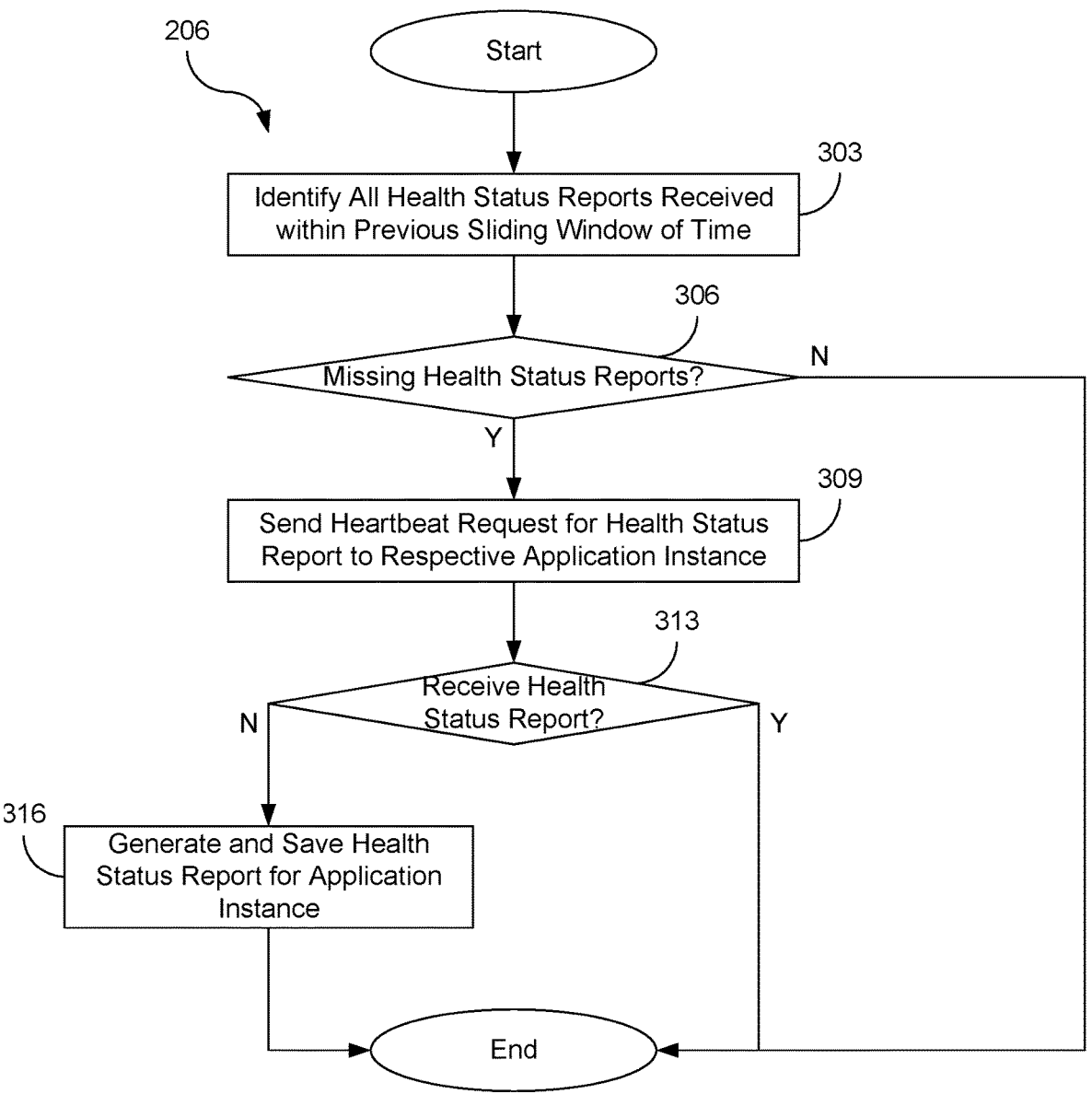
FIG. 3 is a flowchart illustrating one example of functionality implemented as portions of an application executed within the availability zone of FIG. 2A-2C according to various embodiments of the present disclosure.

Referring next to FIG. 3, shown is a flowchart that provides one example of the operation of a portion of the health probe 206 to receive health status reports 213 and respond to situations where an application instance 203 registered with the health probe 206 fails to provide a health status report within a previous sliding window of time. The flowchart of FIG. 3 provides merely an example of the many different types of functional arrangements that can be employed to implement the operation of the depicted portion of the health probe 206. As an alternative, the flowchart of FIG. 3 can be viewed as depicting an example of elements of a method implemented within an availability zone 103 of a cloud provider network.

Beginning with block 303, the health probe 206 can, on a periodic basis, identify all health status reports 213 received within a previous sliding window of time (e.g., within the previous second, previous thirty seconds, previous minute, previous hour, or other predefined or user specified window of time). For example, the health probe 206 could evaluate the task queue 216 to identify all health status reports 213 received but not yet saved.

Then, at block 306, the health probe 206 can determine whether any application instances 203 have failed to provide a health status report 213. For example, the health probe 206 could compare the instance identifier of each health status report identified at block 303 with the set of application instances 203 registered with the health probe 206. If an instance identifier for an application instance 203 in the set of application instances 203 is missing from the set of instance identifiers among the health status reports 213, then the health probe 206 could determine that the application instance 203 had failed to provide any health status reports 213. Similarly, the health probe 206 could use a machine-learning algorithm to predict an expected number of health status reports 213 from each of the registered application instances 203 within the sliding window of time. If the expected number of health status reports 213 for an application instance deviates by more than an expected amount predicted by the machine-learning algorithm (e.g., one or two standard deviations), then the health probe 206 could determine that the application instance 203 had failed to provide an expected number or amount of health status reports 213. Accordingly, the process could proceed to block 309 in order to attempt to force the application instance 203 to provide at least one health status report 213. However, if all of the application instances 203 have provided an expected number of health status reports 213 (e.g., at least one) within the predefined sliding window of time, then the process can end.

Next, at block 309, the health probe 206 can send a heartbeat request to the reporting agent 219 for the respective application instance 203. This could be done in an attempt to retrieve a health status report 213 or additional health status report 213 from the reporting agent 219 (e.g., by sending a request in order to obtain a response).

Moving on to block 313, the health probe 206 can determine if the health status report 213 was received from the reporting agent 219 that was sent a request at block 309. This could be done by checking the task queue 216 to see if any health status reports 213 have been saved to the task queue 216 by the reporting agent 219. If a health status report 213 was not received, then the process can proceed to block 316. Otherwise, the process can end.

If the process proceeds to block 316, then the health probe 206 can generate and save a health status report 213 for the application instance 206. For example, the health probe 206 could generate a health status report 213 indicating that the application instance 203 is currently down. The health status report 213 could include a maximum weight for the health status report 213 (e.g., to indicate that the application instance 203 is down instead of operating in a degraded state) and also include the instance identifier and service identifier for the application instance 203. The process could then end.

Figure 4:
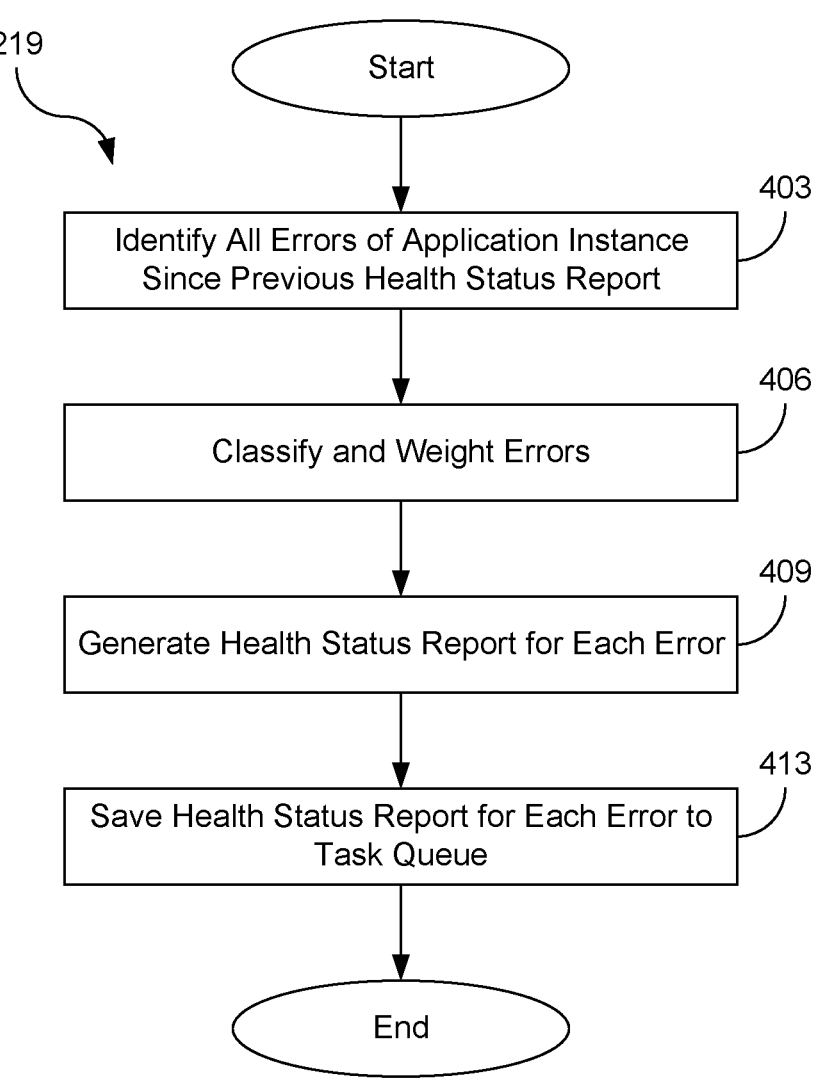
FIG. 4 is a flowchart illustrating one example of functionality implemented as portions of an application executed within the availability zone of FIG. 2A-2C according to various embodiments of the present disclosure.

Referring next to FIG. 4, shown is a flowchart that provides one example of the operation of a portion of a reporting agent 219 to generate and send health status reports 213 for an application instance 203. The flowchart of FIG. 4 provides merely an example of the many different types of functional arrangements that can be employed to implement the operation of the depicted portion of the reporting agent 219. As an alternative, the flowchart of FIG. 4 can be viewed as depicting an example of elements of a method implemented within an availability zone 103 of a cloud provider network.

Beginning with block 403, the reporting agent 219 can identify all errors that have occurred within the application instance 203 since the previous health status report 213 was saved to the task queue 216. For example, the reporting agent 219 could analyze log files or event logs for the application instance 203 to identify errors, warnings, or other conditions to report. As another example, the reporting agent 219 could measure the performance of the application instance 203 (e.g., average time to respond to a request, average number of requests processed per unit or period of time, etc.). Any deviations in the performance over time (e.g., a sudden drop or steady decline in average time to respond to a request or average number of requests processed per unit or period of time, etc.) could be identified as potential errors. Moreover, even if no errors are detected, a lack of errors could be reported as an "error" with no weight to the health probe 206 for the purpose indicating to the health probe 206 that the application instance 203 is still operating.

Then, at block 406, the reporting agent 219 can classify all of the errors identified and assign them a predefined weight (where the weight is defined by the operator of the application instance 203). For example, warnings or errors that might impact the performance of the application instance 203, but not result in a failure of the application instance 203, could be assigned a low weight. For example, retriable errors, where the error can be resolved by retrying the operation until it succeeds (e.g., a failed database read or write that later succeeds), could be assigned lower weights. In contrast, warnings or errors that would cause the application instance 203 to fail without recourse (e.g., a failed database connection that prevents all database reads and writes or a failed webserver that prevents the application instance 203 from responding to any requests for a webpage), could be assigned higher weights.

Next, at block 409, the reporting agent 219 can generate a health status report 213 for each error identified at block 406 and classified at block 406. The health status report 213 could include a category of the event or incident, the time the event or incident occurred, a weight representing the severity or impact of the event (predefined by the application instance 203), a description of the event (predefined by the application instance 203), an instance identifier of the application instance 203, and a service identifier of the application service 109 that the application instance 203 is registered to, associated with, or a component of.

Subsequently, at block 413, the reporting agent 219 can save each health status report 213 to the task queue 216. For example, the reporting agent 219 could send a message to the data store 209 for each health status report 213, where the message causes the data store 209 to store the health status report 213 in the task queue 216. As another example, the reporting agent 219 could open or maintain a connection with the data store 209, which could be used by the reporting agent 219 to save or write new health status reports 213 to the task queue 216.

Figure 5:
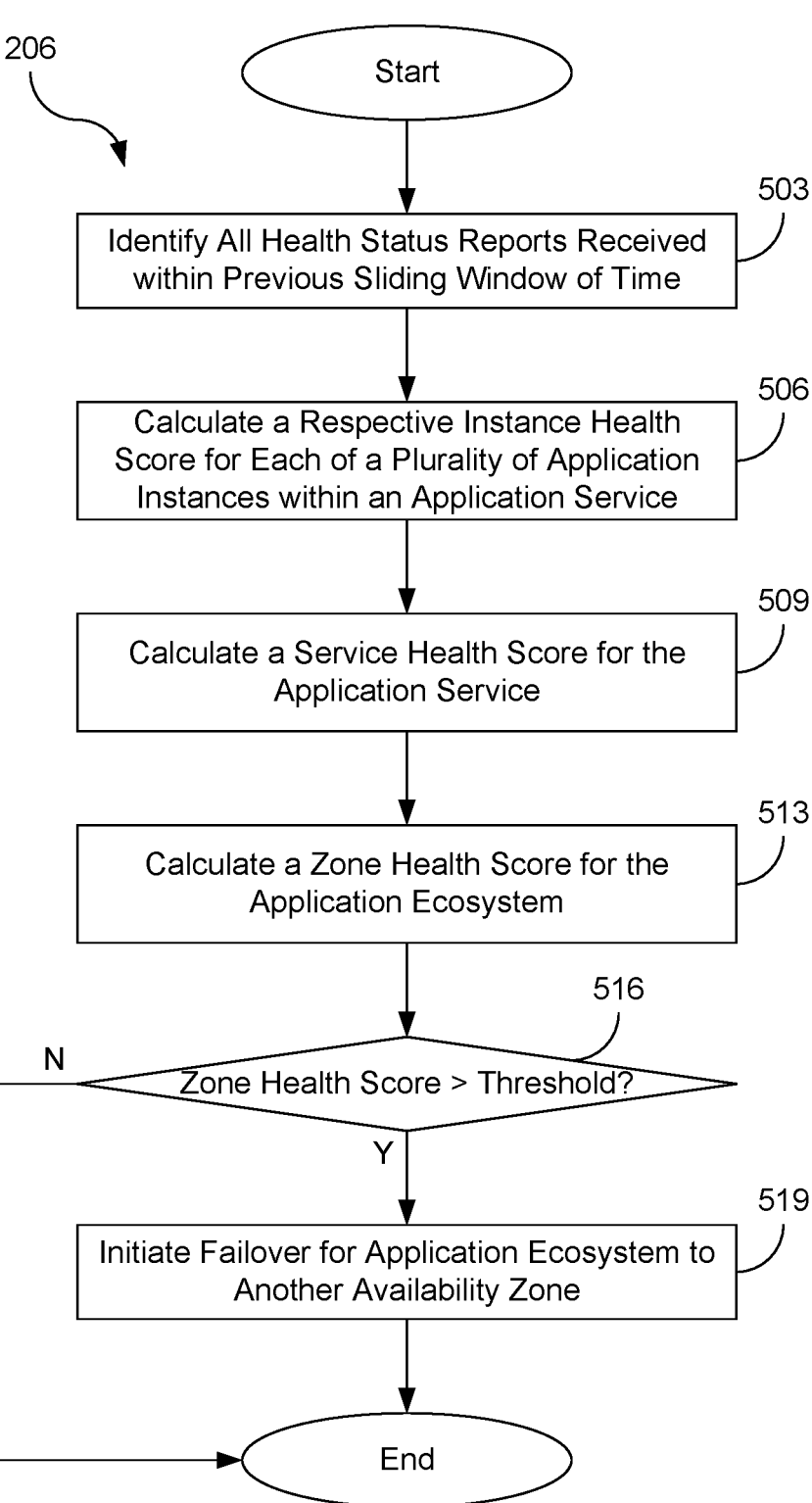
FIG. 5 is a flowchart illustrating one example of functionality implemented as portions of an application executed within the availability zone of FIG. 2A-2C according to various embodiments of the present disclosure.

Referring next to FIG. 5, shown is a flowchart that provides one example of the operation of a portion of the health probe 206 to make a failover decision for the application ecosystem 200. The flowchart of FIG. 5 provides merely an example of the many different types of functional arrangements that can be employed to implement the operation of the depicted portion of the health probe 206. As an alternative, the flowchart of FIG. 5 can be viewed as depicting an example of elements of a method implemented within an availability zone 103 of a cloud provider network.

Beginning with block 503, the health probe 206 can, on a periodic basis, identify all health status reports 213 received within a previous sliding window of time (e.g., within the previous second, previous thirty seconds, previous minute, previous hour, or other predefined or user specified window of time). For example, the health probe 206 could search the data store 209 for all health status reports 213 saved to the data store 209 that have a timestamp that falls within the previous sliding window of time. The previous sliding window of time used at block 503 may be different than the previous sliding window of time used at block 303. For example, a smaller sliding window of time could be used for the purpose of processing health status reports 213 received from reporting agents 219, while a larger sliding window of time could be used to collect a sufficient number of health status reports 213 to make accurate failure determinations and sufficiently informed failover decisions.

Then, at block 506, the health probe 206 can calculate a respective instance health score for each application instance 203 within an application service 109. The instance health score for each application instance 203 could be calculated using a variety of approaches.

For example, the instance health score can be calculated as a weighted average of each of the health status reports 213 received from the application instance 203 within the previous sliding window of time. For instance, a health status report 213 could represent a low, medium, high, or critical severity error with respective weights of 1, 2, 3, and 4 to represent the relative importance of the types of errors. A weighted average could then be computed based on whether any health status reports 213 had been received in a particular category, as represented by the formula:

$$wAvg = \frac{0.1(A) + 0.2(B) + 0.3(C) + 0.4(D)}{(A + B + C + D)}$$

where A represents the number of low severity health status reports 213 received, B, represents the number of medium severity health status reports 213 received, C represents the number of high severity health status reports 213 received, and D represents the number of critical status reports received. Other, similar formulas could be used in other implementations of the present disclosure (e.g., where severities could be weighted differently, additional levels of severity are considered, etc.).

Alternatively, the instance health score can be calculated as an unweighted average of each of the health status reports 213 received from the application. For example, a health status report 213 could represent a low, moderate, medium, high, or critical severity error with respective weights of 1, 2, 4, 8, and 10 to represent the relative importance of the types of errors. If three critical and ten moderate errors were reported, then the instance health score would be the average of (3(30)+10(2))/13, which results in an average score of 8.4 on a scale of 1-10. This would indicate that the application instance 203 is in a high danger of failing due to the presence of the multiple critical errors.

Next, at block 509, the health probe 206 can calculate a service health score for the application service 109. This can be done by averaging the instance health scores computed at block 506 of the application instances 203 that form the application service 109.

Moving on to block 513, the health probe 206 can calculate a zone health score for the application ecosystem 200. The zone health score could be calculated as a weighted average of the service health scores of the application services 109 within the application ecosystem 200. In an application ecosystem with only three application services 109, an example formula that weights two application services 109 more heavily than a third application service 109 could be:

$$wAvg = \frac{0.2(X) + 0.2(Y) + 0.3(Z)}{3}$$

where X, Y, and Z represent the service health scores of application services 109 within the application ecosystem.

A weighted average could be used to account for the relative importance of individual application services 109 within the application ecosystem 200. For example, some application services 109 could be critical to the operation of the application ecosystem 200, while other application services 109 that provide optional features or services could fail without impacting the required functionality provided by the application ecosystem 200. For example, in a payment processing application ecosystem 200, application services 109 related to payment authorization and fraud detection and prevention might be weighted more heavily than an application service 109 that transfers funds between accounts. The first two application services 109 would be required to verify and authorize valid payments, while the third application service 109 could be offline for a period of time without impacting the customer or merchant experience because funds could be transferred between accounts at a later point in time (e.g., from a user's credit card account to a merchant account) to complete a payment.

Subsequently, at block 516, the health probe 206 can determine if the zone health score calculated at block 513 exceeds a threshold value defined by the operator of the application ecosystem 200. If the zone health score exceeds the threshold value, then this could indicate that the application ecosystem 200 is in danger of failing and failover should occur. In this situation, the process could proceed to block 519. However, if the zone health score does not exceed the threshold, then this could indicate that the application ecosystem 200 is capable of continued operation. In this situation, the process could end.

If the process proceeds to block 519, the health probe 206 can initiate a failover of the application ecosystem 200. For example, the health probe 206 could send a message to the cloud service provider to migrate the application ecosystem 200 from its current availability zone 103 to another availability zone 103 within the region. Likewise, failover could also cause the health probe 206 and data store 209 to be migrated from the current availability zone 103 to the destination availability zone 103 of the application ecosystem 200. Once failover is initiated, the process can then end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

determine that an application instance among a plurality of application instances has failed to provide a health status report;

send a heartbeat request to the application instance for the health status report;

determine that the application instance failed to respond to the heartbeat request;

generate and save a separate health status report for the application instance in response to a determination that the application instance failed to respond to the heartbeat request, the separate health status report comprising a maximum weight;

calculate a respective instance health score for each of the plurality of application instances within an application service, wherein each respective instance health score is based at least in part on a respective plurality of health status reports for each of the plurality of application instances within a period of time, and wherein each of the respective plurality of health status reports for each of the plurality of application instances is based at least in part on a weight associated with a relative importance of a type of error;

calculate a service health score for the application service, wherein the application service comprises the plurality of application instances and the service health score is based at least in part on the respective instance health score for each of the plurality of application instances;

calculate a zone health score for an application ecosystem based at least in part on a plurality of service health scores, wherein the application ecosystem comprises a plurality of application services and each of the plurality of service health scores is associated with a respective one of the plurality of application services within the application ecosystem, and wherein the service health score for the respective one of the plurality of application services is based at least in part on a weight associated with a relative importance of the respective one of the plurality of application services;

initiate a failover of the application ecosystem from a first availability zone to a second availability zone based at least in part on the zone health score; and migrate the application ecosystem from the first availability zone to the second availability zone in response to the failover.

2. The system of claim 1, wherein the machine-readable instructions further cause the computing device to at least:

determine that the zone health score exceeds a predefined threshold; and initiate the failover in response to a determination that the zone health score exceeds the predefined threshold.

3. The system of claim 1, wherein the machine-readable instructions that cause the computing device to calculate the respective instance health score for each of the plurality of application instances, when executed, further cause the computing device to at least:

calculate a respective weighted average score for each of the plurality of application instances, wherein the respective weighted average score is based at least in part upon the respective plurality of health status reports for each of the plurality of application instances within the period of time, each of the respective plurality of health status reports representing a health event, a weight for the health event, and an availability of each application instance.

4. The system of claim 3, wherein the weight for the health event represents a severity of the health event.

5. The system of claim 1, wherein the machine-readable instructions that cause the computing device to calculate the service health score for the application service, when executed by the processor, further cause the computing device to at least calculate an average score from the respective instance health score for each of the plurality of application instances within the application service.

6. The system of claim 1, wherein each service health score for the respective one of the plurality of application services within the application ecosystem has a predefined weight and the machine-readable instructions that cause the computing device to calculate the zone health score further cause the computing device to at least calculate the zone health score as a weighted average of each service health score for each respective application service of the plurality of application services.

7. The system of claim 1, wherein the machine-readable instructions that, when executed by the processor, cause the computing device to determine that the application instance among the plurality of application instances has failed to provide the health status report further cause the computing device to at least:

predict an expected number of health status reports from the application instance among the plurality of application instances within the period of time;

determine a number of health status reports from the application instance among the plurality of application instances deviates from the expected number of health status reports; and determine the application instance among the plurality of application instances failed to provide the expected number of health status reports.

8. A method, comprising:

determining that an application instance among a plurality of application instances has failed to provide a health status report;

sending a heartbeat request to the application instance for the health status report;

determining that the application instance failed to respond to the heartbeat request;

generating and saving a separate health status report for the application instance in response to a determination that the application instance failed to respond to the heartbeat request, the separate health status report comprising a maximum weight;

calculating a respective instance health score for each of the plurality of application instances within an application service, wherein each respective instance health score is based at least in part on a respective plurality of health status reports for each of the plurality of application instances within a period of time, and wherein each of the respective plurality of reported health scores for each of the plurality of application instances is based at least in part on a weight associated with a relative importance of a type of error;

calculating a service health score for the application service, wherein the application service comprises the plurality of application instances and the service health score is based at least in part on the respective instance health score for each of the plurality of application instances;

calculating a zone health score for an application ecosystem based at least in part on a plurality of service health scores, wherein the application ecosystem comprises a plurality of application services and the service health score is one of a plurality of service health scores for a respective one of the plurality of application services within the application ecosystem, and wherein the service health score for the respective one of the plurality of application services is based at least in part on a weight associated with a relative importance of the respective one of the plurality of application services;

initiating a failover of the application ecosystem from a first availability zone to a second availability zone based at least in part on the zone health score; and migrating the application ecosystem from the first availability zone to the second availability zone in response to the failover.

9. The method of claim 8, further comprising:

determining that the zone health score exceeds a predefined threshold; and initiating the failover in response to a determination that the zone health score exceeds the predefined threshold.

10. The method of claim 8, wherein calculating the respective instance health score for each of the plurality of application instances further comprises calculating a respective weighted average score for each of the plurality of application instances, wherein the respective weighted average score is based at least in part upon a respective plurality of health status reports for each of the plurality of application instances within the period of time, each of the respective plurality of health status reports representing a health event, a weight for the health event, and an availability of each application instance.

11. The method of claim 10, wherein the weight for the health event represents a severity of the health event.

12. The method of claim 8, wherein calculating the service health score for the application service further comprises calculating an average score from the respective instance health score for each of the plurality of application instances within the application service.

13. The method of claim 8, wherein each service health score for the respective one of the plurality of application services within the application ecosystem has a predefined weight and calculating the zone health score further comprises calculating the zone health score as a weighted average of each service health score for each respective application service of the plurality of application services.

14. The method of claim 8, wherein determining that the application instance among the plurality of application instances has failed to provide the health status report further comprises:

predicting an expected number of health status reports from the application instance among the plurality of application instances within the period of time;

determining a number of health status reports from the application instance among the plurality of application instances deviates from the expected number of health status reports; and determining the application instance among the plurality of application instances failed to provide the expected number of health status reports.

15. A non-transitory computer-readable medium, comprising machine-readable instructions that, when executed by a processor of a computing device, cause the computing device to at least:

determine that an application instance among a plurality of application instances has failed to provide a health status report;

send a heartbeat request to the application instance for the health status report;

determine that the application instance failed to respond to the heartbeat request;

generate and save a separate health status report for the application instance in response to a determination that the application instance failed to respond to the heartbeat request, the separate health status report comprising a maximum weight;

calculate a respective instance health score for each of the plurality of application instances within an application service, wherein each respective instance health score is based at least in part on a respective plurality of health status reports for each of the plurality of application instances within a period of time, and wherein each of the respective plurality of health status reports for each of the plurality of application instances is based at least in part on a weight associated with a relative importance of a type of error;

calculate a service health score for the application service, wherein the application service comprises the plurality of application instances and the service health score is based at least in part on the respective instance health score for each of the plurality of application instances;

calculate a zone health score for an application ecosystem based at least in part on a plurality of service health scores, wherein the application ecosystem comprises a plurality of application services and the service health score is one of a plurality of service health scores for a respective one of the plurality of application services within the application ecosystem, and wherein the service health score for the respective one of the plurality of application services is based at least in part on a weight associated with a relative importance of the respective one of the plurality of application services;

initiate a failover of the application ecosystem from a first availability zone to a second availability zone based at least in part on the zone health score; and migrate the application ecosystem from the first availability zone to the second availability zone in response to the failover.

16. The non-transitory computer-readable medium of claim 15, wherein the machine-readable instructions further cause the computing device to at least:

determine that the zone health score exceeds a predefined threshold; and initiate the failover in response to a determination that the zone health score exceeds the predefined threshold.

17. The non-transitory computer-readable medium of claim 15, wherein the machine-readable instructions that cause the computing device to calculate the respective instance health score for each of the plurality of application instances, when executed, further cause the computing device to at least:

calculate a respective weighted average score for each of the plurality of application instances, wherein the respective weighted average score is based at least in part upon a respective plurality of health status reports for each of the plurality of application instances within the period of time, each of the respective plurality of health status reports representing a health event, a weight for the health event, and an availability of each application instance.

18. The non-transitory computer-readable medium of claim 15, wherein the machine-readable instructions that cause the computing device to calculate the service health score for the application service, when executed by the processor, further cause the computing device to at least calculate an average score from the respective instance health score for each of the plurality of application instances within the application service.

19. The non-transitory computer-readable medium of claim 15, wherein each service health score for the respective one of the plurality of application services within the application ecosystem has a predefined weight and the machine-readable instructions that cause the computing device to calculate the zone health score further cause the computing device to at least calculate the zone health score as a weighted average of each service health score for each respective application service of the plurality of application services.

20. The non-transitory computer-readable medium of claim 15, wherein the machine-readable instructions that, when executed by the processor, cause the computing device to determine that the application instance among the plurality of application instances has failed to provide the health status report further cause the computing device to at least:

predict an expected number of health status reports from the application instance among the plurality of application instances within the period of time;

determine a number of health status reports from the application instance among the plurality of application instances deviates from the expected number of health status reports; and determine the application instance among the plurality of application instances failed to provide the expected number of health status reports.

* * * * *